United States Patent [19]

Fortune

[11] 4,419,566
[45] Dec. 6, 1983

[54] HOT AIR SOLDERING AND RESOLDERING SYSTEM

[76] Inventor: William S. Fortune, 29866 Cuthbert St., Malibu, Calif. 90265

[21] Appl. No.: 264,362

[22] Filed: May 18, 1981

[51] Int. Cl.³ .............................................. B23K 3/04
[52] U.S. Cl. .................................. 219/230; 219/373;
219/380; 228/20; 228/242
[58] Field of Search .......................... 228/20, 242, 46;
219/230, 373, 380; 165/61

[56] References Cited

U.S. PATENT DOCUMENTS

| 3,163,145 | 12/1964 | Duhaime et al. | 219/230 X |
| 3,422,247 | 1/1969 | Royston et al. | 219/380 X |
| 3,883,716 | 5/1975 | Fortune | 219/241 |
| 4,055,744 | 10/1977 | Fortune | 219/239 |
| 4,187,973 | 2/1980 | Fortune | 228/20 |
| 4,205,221 | 5/1980 | Meyer | 219/230 |
| 4,260,439 | 4/1981 | Speer | 219/380 X |

Primary Examiner—Nicholas P. Godici
Assistant Examiner—M. Jordan
Attorney, Agent, or Firm—Daniel T. Anderson

[57] ABSTRACT

A hot air soldering and resoldering system may include means for also generating a jet of room-temperature or cold air. The hot air jet issues from a jet tip having an axial bore. The air is heated by a heater element and closed in a conventional heater sleeve. Surrounding the heater sleeve is a retainer sleeve to form a large preheating chamber. The jet tip is provided with a tip assembly sleeve which extends between the heater sleeve and the retainer sleeve but is substantially shorter than the retainer sleeve. A heating chamber is formed between the heater sleeve and the tip assembly sleeve which is connected to the bore through the tip. The temperature control disposed in the handle of the instrument. Also, the air flow is controlled. This will provide a jet of hot air which may be used for liquifying a small amount of solder and hence can be used for soldering and resoldering.

9 Claims, 12 Drawing Figures

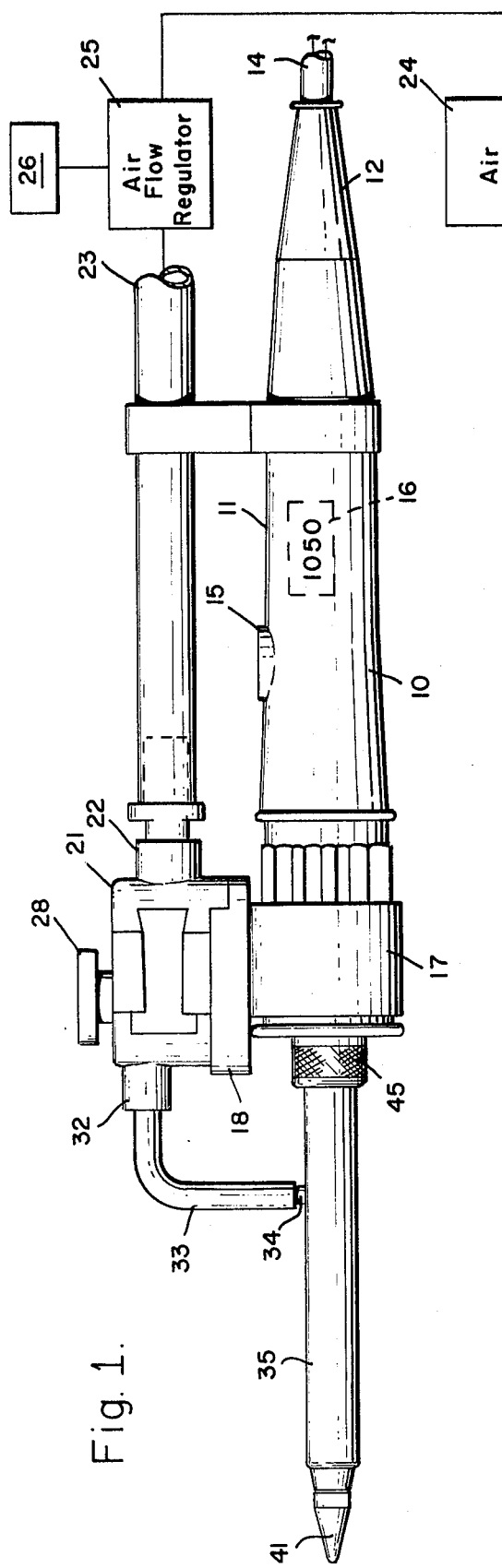
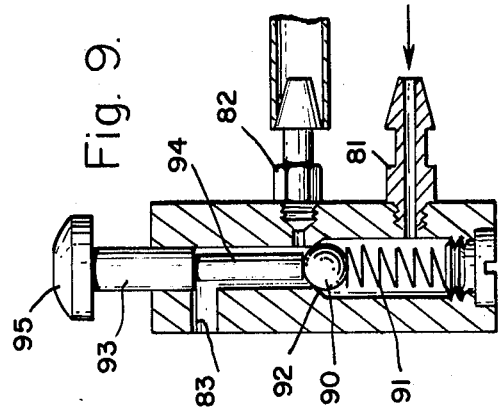
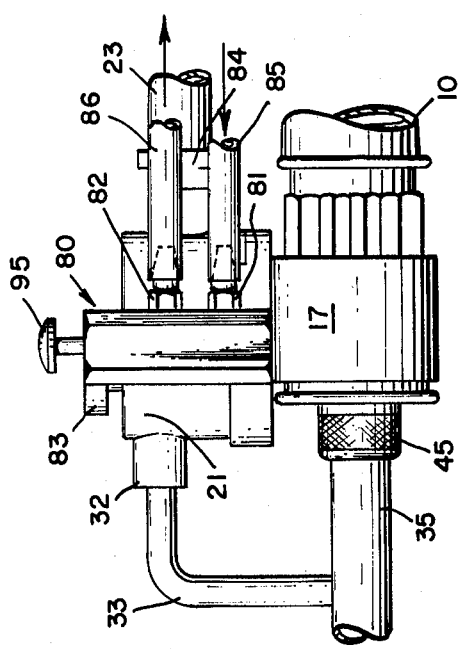
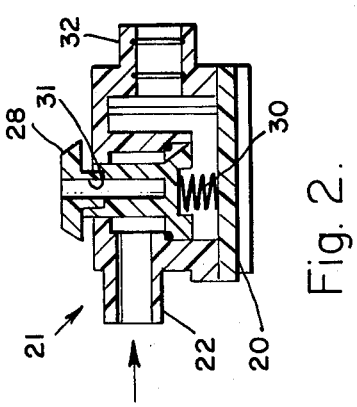
Fig. 1.
Fig. 2.
Fig. 8.
Fig. 9.

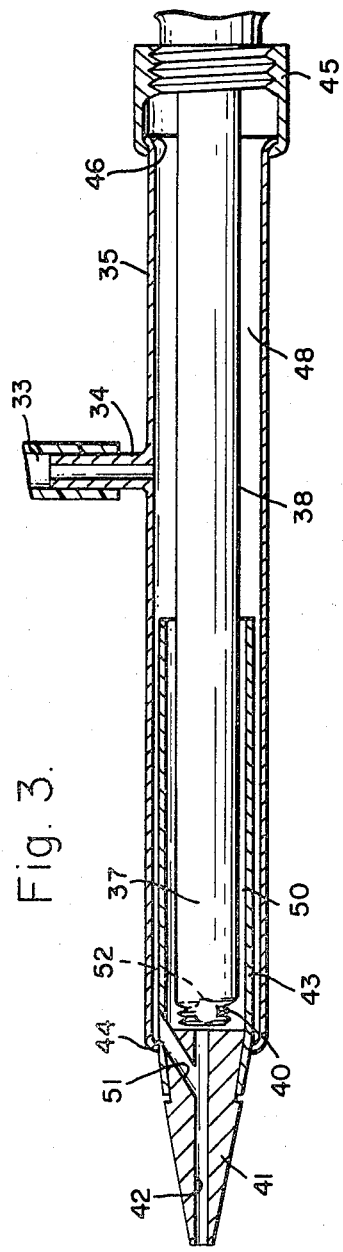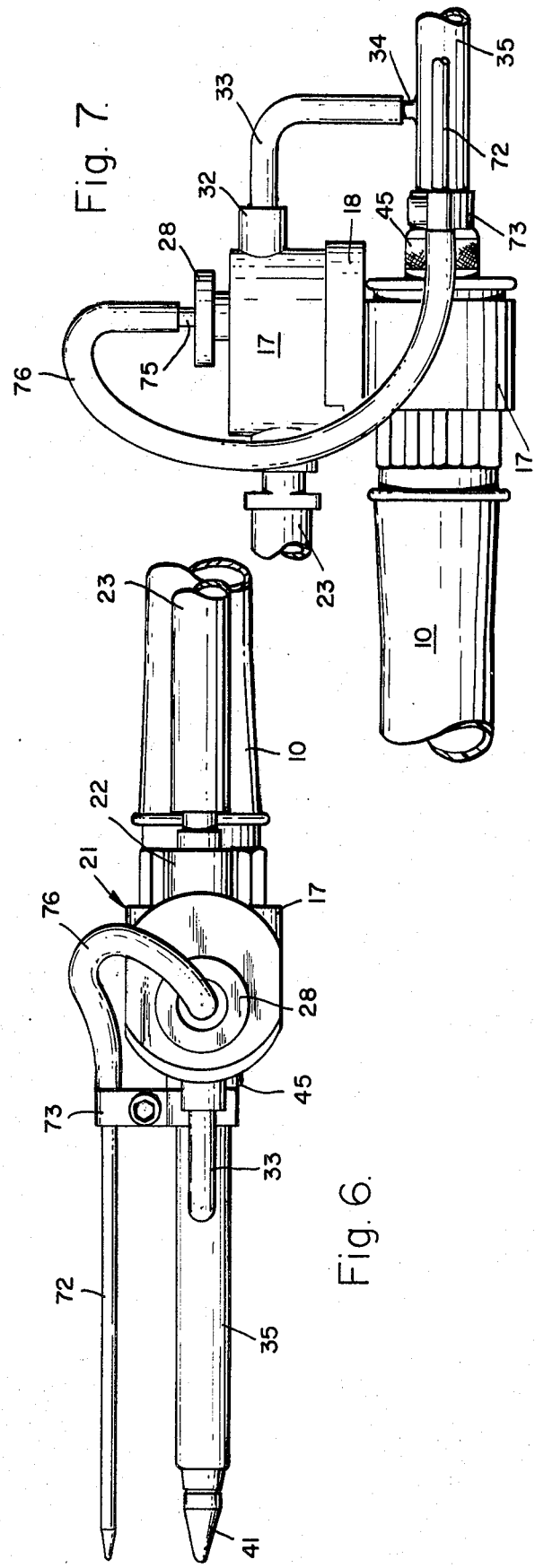

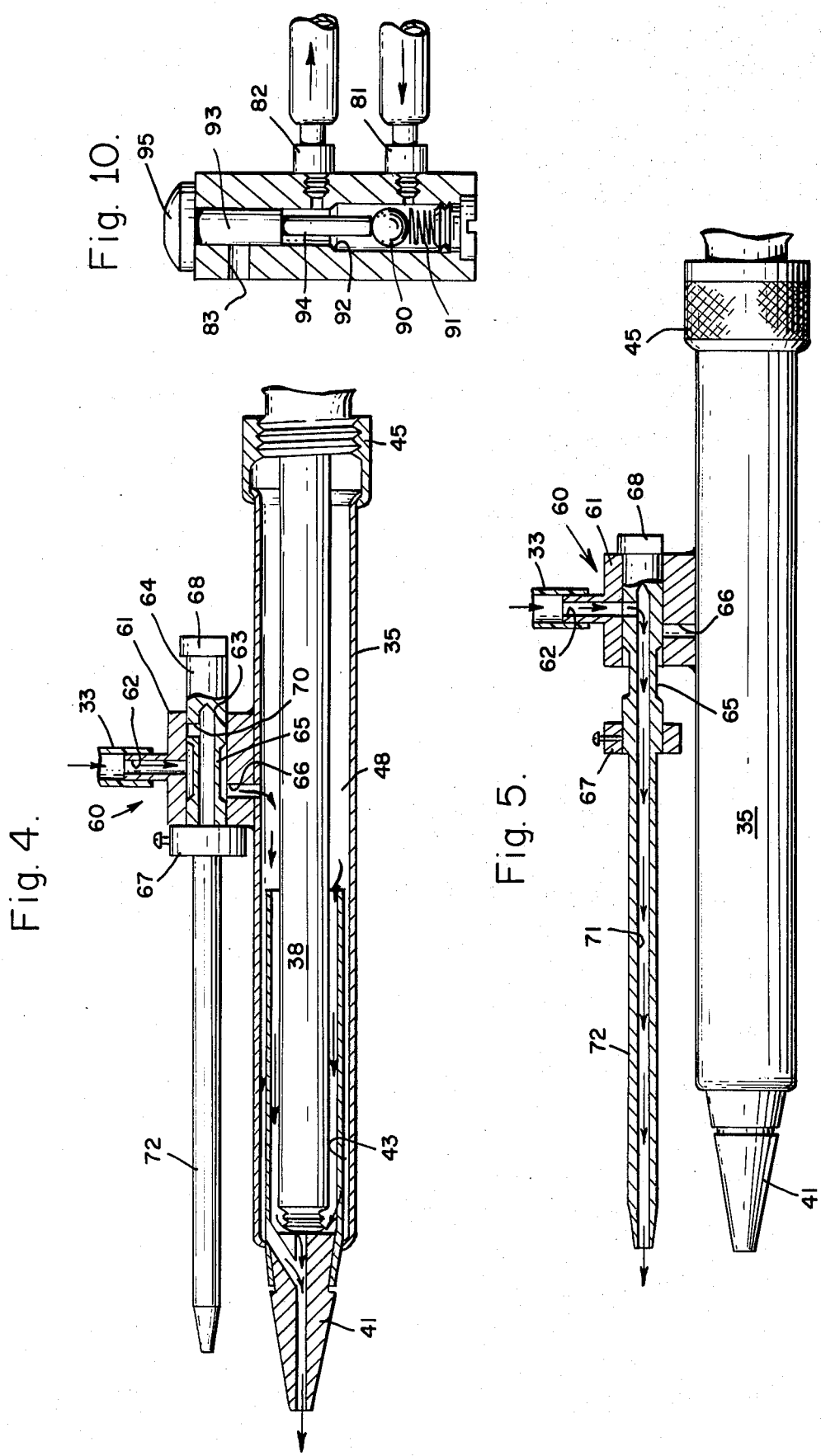

HOT AIR SOLDERING AND RESOLDERING SYSTEM

BACKGROUND OF THE INVENTION

The present invention is directed to a soldering system which utilizes hot air for soldering or resoldering purposes.

Heating of a component by hot air heats the component by convection. A conventional soldering instrument heats a component through the soldering tip by conduction. This has the disadvantage that it is possible to damage the circuit board or a component by accidental contact with the hot soldering tip or by accidentally electrically shorting a component by the hot tip. When a jet of hot air is used, there is no contact between the circuit board or a component and hence the danger of damage to either is much reduced. This permits to trouble shoot an active circuit.

In accordance with the present invention, a temperature-controlled soldering instrument must be used to control the temperature of the air. Such an instrument has been disclosed and claimed in the applicant's prior U.S. Pat. No. 3,883,716. An improvement of the patent just referred to is applicant's U.S. Pat. No. 4,055,744. Reference is also made to the applicant's prior U.S. Pat. No. 4,187,973. This patent disclosed the combination of an instrument of the two prior U.S. Pat. Nos. 3,883,,716 and 4,055,774 with the addition of a desoldering attachment. The desoldering attachment will, by vacuum action, suck up the solder liquified by the soldering instrument. The temperature control and display circuit provision may be of the type described and claimed in the copending patent application of Griffith and Murray, Ser. No. 223,679, filed Jan. 9, 1981, described and designed in the copending application to Murray, Ser. No. 248,187, filed Mar. 30, 1981, both being assigned to Edsyn, Inc., of which the present applicant is the president.

Finally, reference is made to the applicant's prior application, Ser. No. 223,680, filed on Jan. 9, 1981. The disclosure of this application is included herein by way of reference.

SUMMARY OF THE INVENTION

In accordance with the present invention, the air for the hot in jet is heated by the conventional heater element of a soldering instrument. The heater element is enclosed by a heater sleeve which, in turn, is enclosed by an outer or retainer sleeve. The tip assembly includes a jet tip having an axial bore and a tip assembly sleeve extending therefrom and surrounding the heater sleeve. The heater sleeve is much shorter than the retainer sleeve and surrounds essentially only the heater element.

Hence, a relatively large preheating chamber is formed between the heater and retainer sleeves. On the other hand, a relatively small heating chamber is formed between the heater sleeve and the tip assembly sleeve, and between the latter and the retainer sleeve, and a connection is formed between the heating chamber and the hollow space of the tip.

By suitably controlling the temperature of the heating element and the rate of flow of the air, the air can be heated so that a hot air jet issues from the tip.

In addition, several arrangements are disclosed for generating a directed jet of cold air which may be used for various purposes.

The novel features that are considered to be characteristic of this invention are set forth with particularly in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is a side elevational view of a soldering instrument to which has been attached a resoldering attachment embodying the present invention;

FIG. 2 is a cross-sectional view of a three-way valve which has been disclosed and claimed in the above-referred to prior application of the applicant;

FIG. 3 is a sectional view on enlarged scale to illustrate the large preheating chamber and the small heating chamber for the generation of a hot air stream;

FIG. 4 is a side elevational view partly in cross-section to illustrate a three-way valve which may be used with a soldering and resoldering instrument for directing the air either through the preheating chamber or into a cold air tube for cooling a component, the valve being shown in a position to direct cold air into the preheating chamber;

FIG. 5 is a sectional view similar to that of FIG. 4 and showing the valve in a position for directing cold air into a cold air tube;

FIG. 6 is an elevational view illustrating another arrangement for connecting cold air to the cold air tube;

FIG. 7 is a top plan view of the arrangement of FIG. 6 to illustrate the connection between the retainer sleeve and the cold air tube;

FIG. 8 is an elevational view similar to that of FIG. 6 but illustrating a three-way valve for controlling the flow of air to the cold air tube of FIG. 7;

FIG. 9 is a cross-sectional view of the three-way valve of FIG. 8 showing it in its normal position which blocks the air from access to the cold air tube and provides an air bleed;

FIG. 10 is a cross-sectional view of the valve of FIG. 9 in its depressed position for allowing the cold air to pass into the cold air tube;

DESCRIPTION OF A PREFERRED EMBODIMENT

Figure 11:
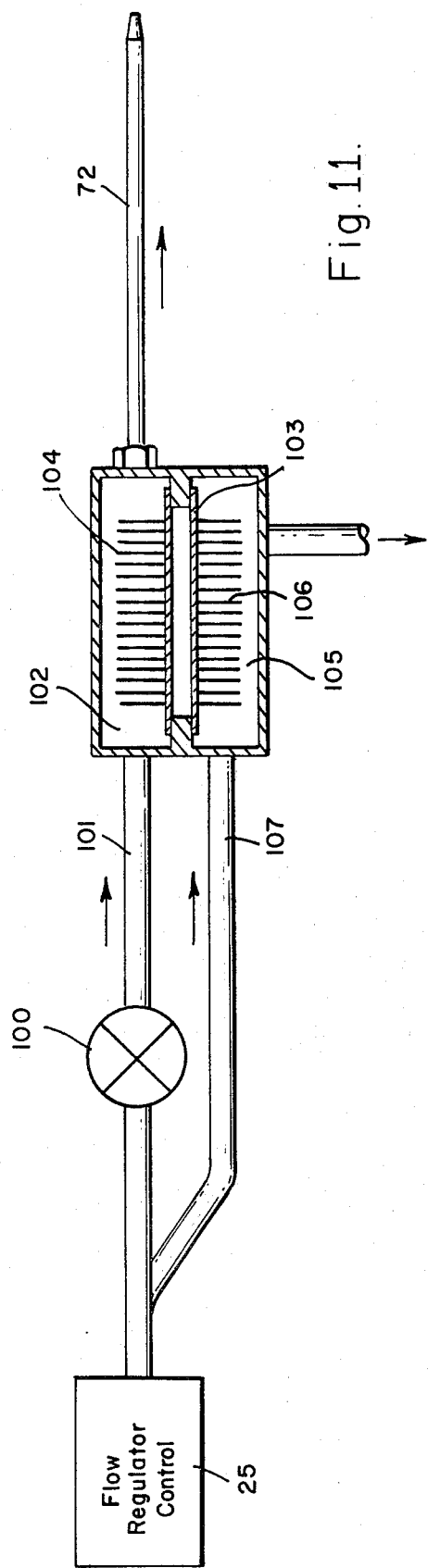
FIG. 11 is a schematic view illustrating a Peltier effect device including a cold and a hot air chamber for cooling ambient air and providing heat transfer to a flow of ambient air.

Referring now to the drawings and particularly to FIGS. 1 to 3, there is illustrated by way of example a preferred embodiment of the invention for generating a jet of hot air for soldering and resoldering purposes. The instrument 10 of FIG. 1 may, for example, be that described and claimed in the applicant's prior patent application above-referred to. The instrument 10 has a generally cylindrical body 11 terminating in a conical end portion 12 from which the electrical cord 14 issues. The handle or housing 11 is provided with an opening 15 for adjusting the temperature set by the electronic circuit in the handle.

A digital readout is shown at 16. The front end of the handle may be provided with a sleeve 17 provided with a female dovetail 18. Secured to the dovetail 18 by a male dovetail 20 is a valve generally shown at 21, which is disclosed and claimed in connection with FIGS. 18 through 20 of the applicant's prior application. The valve 21 is provided with a relatively large nipple 22 to which is connected an air hose 23. The air hose 23 may be connected to an air supply 24 of pressurized air and a conventional air flow regulator 25 which may be controlled by the knob, 26.

The three-way valve 21 is provided with a spring-biased button 28 which is urged upwardly by the spring 30. The button 28 is provided with a central opening 31. In the position shown in FIG. 2, the control button 28 is in its normal position, blocking off the air into the outlet nipple 32. Accordingly, normally the air will bleed off through the opening 31. However, when the button 28 is depressed by a finger to close up the opening 31, the input nipple 22 is connected to the output nipple 32. The entire valve 21 is connected by the two dovetailed portions 18, 20 to the sleeve 17.

A hose 33 is connected to the nipple 32 and is in turn connected to a metal tube 34, connected in turn to a retainer sleeve 35. The construction of the tip assembly 36, which will now be described, is somewhat similar to that of the applicant's prior U.S. Pat. No. 4,055,744, as illustrated in FIGS. 2 and 3 thereof.

The entire heating chamber assembly 36 includes a heater element 37 enclosed in a heater sleeve 38. Hence, it will be seen that the heater sleeve is substantially longer than the heater element. While the heater sleeve 38 may conventionally be provided with a screw thread 40, at its end near the tip 41, the screw thread serves no purpose in accordance with the assembly of the present invention. The tip 41 is provided with an axial bore 42 and with a tip assembly sleeve 43 which is fixedly connected thereto.

The tip assembly sleeve extends substantially over the heater element 37. Heater sleeve 38 and tip assembly sleeve 43 are surrounded by the retainer sleeve 35. The end near the tip of the retainer sleeve 35 may be rolled over as shown at 44. The other end is provided with a nut 45 which is retained by the rolled-over end 46 of the retainer sleeve 35.

It will now be evident that a preheating chamber 48 is formed between the heater sleeve 38 and the retainer sleeve 35. This preheater chamber 48 is heated by the heater sleeve 38 which in turn is heated by the heater element 37; that is, by conduction. However, it will be evident that the temperature in the preheating chamber 48 is less than that provided by the heater element 37. The heating chamber 50 is formed between the heater sleeve 38 and the tip assembly sleeve 43 on the one hand, and the retainer sleeve 35 on the other hand. A connection between the space between sleeves 35 and 43 and the axial bore 42 in the jet tip 41 is made by a slanted bore 51.

The rate of flow of the air is controlled by the regulator 25 and its control 26. The temperature of the heating element is controlled through the opening 15, in the handle 11 which in turn controls the set temperature of the electronic control circuit. The actual temperature sensed by a sensor 52 near the forward end of the heater element 37 may be read out by a digital readout 16, in the handle 11.

It will be understood that the cold air introduced in the preheating chamber 48 may swirl about to provide a longer swell time. Since the volume of the heating chamber 50 is so much smaller, the air will move somewhat faster and will allow a still higher speed flowing through the quite narrow bore 42 in the tip 41. This will create a jet of hot air issuing from the bore 42.

Experiments and calculations have shown that the volume of the preheating chamber 48 to the volume of the heating chamber 50 should be approximately ten to one.

It should be noted that a heater element 37 is preferably used which is capable of assuming a temperature of 1,000 F., or 537 C. This is the temperature near the sensor element 52. The temperature of the hot air jet approximately 0.5" from the tip, or 1¼ cm is approximately 750 F. or 400 C. On the other hand, the temperature near the handle 11 may be on the order of 200 F., or 93 C. In order to measure such high temperatures, the sensor 52 should either be a thermocouple or a variable resistor type sensor.

The hot air jet may be used for soldering, desoldering or, resoldering; that is, for liquifying a small amount of solder. One of its purposes is to remove certain components such as flat packs, or lead-less chips from a circuit board.

By way of example, the tip 41 may consist of copper clad with Armco iron. The tip assembly sleeve 43 may also consist of copper plated with electroless nickel.

The instrument preferably is calibrated so that the temperature of the jet at a predetermined distance from the tip 41 is exhibited by the digital readout 16. This may be effected by the sensor 52 forming part of the assembly and which permits to read the temperature constantly.

Alternatively, a separate temperature sensor may be immersed in the air flow and may be connected to a meter. Similarly, it is feasible to permanently install a sensor in the air flow and connect it to a meter.

Referring now to FIGS. 4 through 10, it is also feasible to provide a stream of cold air in addition to, or instead of the stream of hot air. One such arrangement is shown in FIGS. 4 and 5, to which reference is now made. To this end, a three-way valve 60 may be connected by its housing 61 to the retainer sleeve 35. The housing 61 is connected by the hose 33 to the air supply 24. The housingg 61 is provided with a central opening 62 which extends through a cylindrical space 63, disposed normal to the opening 62 in which a piston 64 is slidable. The piston 64 has a reduced diameter portion 65.

When the piston 64 is in the position shown in FIG. 4, the reduced portion 65 permits communication between the bore 62 and an opening 66 through the retainer sleeve 35. It will be noted that the piston 64 is connected to a stop 67 which bears against the housing 61 when the piston is moved toward the left of FIG. 4. In this case, the valve 60 permits the air to enter the preheating chamber 48.

When the piston 64 is moved toward the left as shown in FIG. 5, the reduced diameter portion 65 is substantially outside of the housing 61, while another stop 68 now bears against the housing 61. As a result, a small vertical bore 70, through the piston 64 is in communication with the bore 62 of the housing 61, permitting access to the central bore 71 of a cold air tube 72 the end of which is now adjacent to the tip 41. It will be noted that the end of the cold air tube 72 is spaced from the tip 41 in the position of FIG. 4. On the other hand, it will be evident that the connection between the hose 33 and the bore 66 is blocked by the piston 64 in the position of FIG. 5.

The advantage of the arrangement of FIGS. 4 and 5 is that the cold air tube 71 can be disposed fairly close to the hot air tip 41. On the other hand, it does extend near the hot air nozzle 41 when the tube is moved to the position of FIG. 5. This, in turn, means that the cold air is somewhat heated by the hot air tip 45 and by its proximity to the retainer sleeve 35. The tube 72 may for exambple be made of thin-walled stainless steel tubing. The entire motion of the piston 64 may amount to ¼ inch.

It should be noted that the cold air tube 72 may be fed by room air or by refrigerated air. The latter may be effected by passing a supply of compressed carbon dioxide through a small valve to cool the carbon dioxide, which in turn may be used to cool the air. Another method of providing refrigerated air will be described hereinafter in connection with FIGS. 11 and 12.

FIGS. 6 and 7 illustrate another arrangement for providing cool air to the cold air tube 72. To this end a metal tube 75 may be inserted through the bore 31 of the button 28 of the valve 21 (see FIG. 2). A hose 76 may then be connected to the cold air tube 72, which in turn may be connected to the retainer sleeve 35 by a metallic clamp 73.

This arrangement has the advantage that the air is somewhat cooler because the cold air tube 72 is more spaced from the hot air tip 41 and the retainer sleeve 35.

Also, there is no necessity to utilize the special two-way valve 60 of FIGS. 4 and 5. On the other hand, cold air can also be obtained by inserting the small metal tube 75 into the opening 31 of the valve 21 when cold air is required. It should be noted, in general, that such a hose inserted through the bleed hole 31 of the valve 21 may be used for drying chemicals, adhesives, for cleaning surfaces with a stream of cold air, and the like.

The bleed hole 31 of the valve 21 is quite necessary to prevent the buildup of pressure in the air supply hose 23.

Another method of supplying cold air to the cold air tube 72 is illustrated in connection with FIGS. 8 through 10. In this case another three-way valve 80 may be connected by a male dovetail to the valve 21. The valve 80 has an inlet nipple 81 and an outlet nipple 82, as well as a bleed hole or nipple 83. The inlet nipple 81 is connected by a T connection 84 to the air supply hose 23 which in turn connects a hose 85 to the nipple 81. Another hose 86 is connected, in turn, to the cold air tube 72 as shown in FIG. 8.

The operation of the valve 80 is shown in cross section in FIGS. 9 and 10. FIG. 9 shows the valve in its normal position with a ball 90 biased upwardly by a spring 91. The ball rests against a valve seat 92. Hence the connection between the inlet nipple 81 and the outlet nipple 82 is disconnected by the ball 90. On the other hand the valve stem 93 has a recessed portion 94 which connects the outlet nipple 82 to the bleed nipple 83.

When the valve stem 93 is depressed by its button 95, as illustrated in FIG. 10 the ball 90 is lifted off of the valve seat 92, thus permitting a connection between the inlet nipple 81 and the outlet nipple 82. On the other hand, the bleed nozzle 83 is blocked by the valve stem 93.

The arrangement for FIGS. 8 through 10 requires a separate three-way valve which is dovetailed with the three-way valve 21. On the other hand, the connections to the hot and cold air are permanent. Hence, this arrangement requires a separate valve but may be used for pressurized air.

Figure 12:
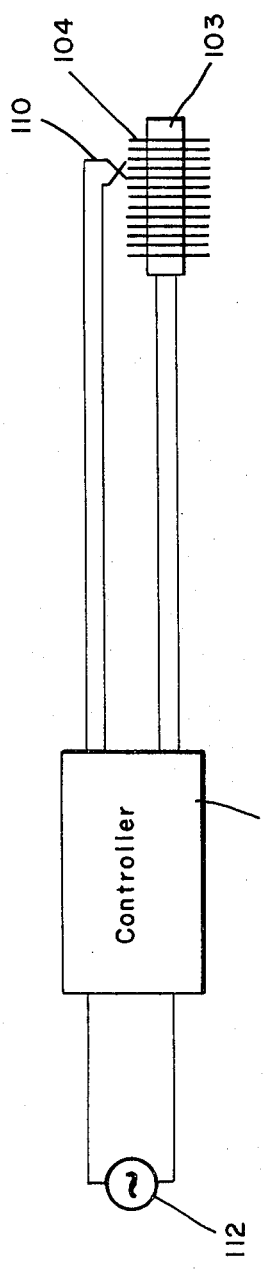
FIG. 12 is a schematic diagram illustrating a control circuit for the Peltier effect device of FIG. 11.

It is also feasible, as indicated before, that the air may be refrigerated by means of a Peltier effect device. This is illustrated in FIGS. 11 and 12, to which reference is now made. As shown in FIG. 11, there may again be provided a small regulator 25 which feeds a push-button air valve 100. From there a hose 101 is connected to a cooling chamber 102, in which is disposed the cold portion of a Peltier effect device 103 having fins 104. A heat exchange chamber 105 houses the hot portion of the Peltier effect device 103 having fins 106 and is provided with a separate air supply through a hose 107 which is also connected to the air flow regulator 25. The refrigerated air provided by the Peltier device 103 feeds again to the cold air tube 72. The fins 106 are cooled by the flow of cold air through the heat exchange chamber 105.

The temperature of the Peltier device 103 is controlled as shown in FIG. 12. The fins 104 of the cold section of the device 103 are provided with a temperature sensor 110 which, in turn, is connected to a controller 111 which is provided with electric input power from the source 112. The controller controls the electric current through the leads 114 to the Peltier device 103, in accordance with the temperature measured by the thermocouple 110, which may be in contact with the fins 104 of the Peltier device. If a very cold air is required two or more Peltier devices may be connected in series, so that one follows another. Cool air from the first device may cool the heat exchange chamber of the second device. Alternatively the cold chamber of the first device may be in thermal contact into the hot chamber of the second device.

It will be understood that the arrangement of FIGS. 4 through 12 may be used separately, that is without the hot air jet generated as illustrated in FIGS. 1 through 3.

There has thus been disclosed a system for providing a jet of hot air for resoldering and soldering purposes. The system includes a preheating chamber and a heating chamber, both being heated by the heater element of a conventional electric soldering instrument. The ratio of the volume of the preheating chamber to the volume of the heating chamber should be approximately ten to one. Both the temperature of the heater element and hence that of the two chambers may be controlled by an electronic control circuit. Furthermore, the rate of flow of the air to the two chambers is also controllable, thereby to provide a very hot jet of air. In addition, various arrangements have been shown for utilizing a source of air to generate a cold stream of air. This may be used for cooling components which have accidentally been heated too much, or for cooling a circuit board, and similar purposes.

What is claimed:
1. In a temperature-controlled soldering instrument:
   (a) a handle housing a temperature-control circuit;
   (b) a tip assembly including a tip having an axial bore and a tip assembly sleeve extending from said tip and secured thereto;
   (c) a heater element;
   (d) a heater sleeve for housing said heater element and extending beyond said element, said tip assembly sleeve surrounding said heater sleeve;
   (e) a retainer sleeve surrounding said tip assembly sleeve and said heater sleeve, said tip assembly sleeve being substantially shorter than said retainer sleeve to form a relatively large preheating cham- ber between said heater and retainer sleeves and a relatively much smaller heating chamber between said heater sleeve and said tip assembly sleeve and said tip assembly and retainer sleeve, said heating chamber being connected to the hollow bore of said tip, whereby cold air passed into said preheating chamber at a predetermined rate of flow is preheated in said preheating chamber and is further heated in said heating chamber when said heater element is heated to a predetermined temperature to deliver a jet of hot air from said hollow tip; and (f) means for connecting said retainer sleeve to said handle.

2. In a soldering instrument as defined in claim 1, wherein the temperature control circuit is adjustable to control the temperature of said heater element.

3. In a soldering instrument as defined in claim 1 wherein the volume of said preheating chamber to the volume of said heating chamber is approximately ten to one.

4. In a soldering instrument as defined in claim 1 wherein a source of controllable flow of air is provided and a three-way valve disposed between said source andd said retainer sleeve, said three-way valve being normally arranged to bleed the air from said source into the atmosphere and operable to admit air into said preheating chamber.

5. In a soldering instrument as defined in claim 4 wherein an additional three-way valve is provided, said additional three-way valve having an input connected between said source and said three-way valve, said additional valve having a normal position where the air leaks into the atmosphere and operable to connect the air to a cold air tube extending to the neighborhood of said tip.

6. In a soldering instrument as defined in claim 5 wherein said cold air tube is mounted on and spaced from said retainer sleeve.

7. In a soldering instrument as defined in claim 5 wherein said additional three-way valve is mounted in close proximity to and on said retainer sleeve, said additional three-way valve including a movable piston substantially parallel to the axis of said retainer sleeve.

8. In a soldering instrument as defined in claim 7 wherein said piston has an outer portion of reduced diameter to permit air from its intake port to move directly thorugh said retainer sleeve into said preheating chamber and said piston having an opening spaced from said reduced diameter portion being connected to said cold air tube to provide a direct connection between the intake port thereof and said tube when said piston is moved forwardly to said tip, whereby ambient or cold air may be ejected in close vicinity to said tip.

9. In a soldering instrument as defined in claim 4 wherein a cold air tube is provided, said cold air tube being connected to the bleed hole of said three-way valve.

* * * * *